United States Patent [19]

Zevlakis

[11] Patent Number: 4,762,483
[45] Date of Patent: Aug. 9, 1988

[54] APPARATUS FOR PACKAGING AND DISPENSING ICE CREAM AND THE LIKE

[76] Inventor: John M. Zevlakis, 21-09 19th St., Long Island, N.Y. 11105

[21] Appl. No.: 59,329

[22] Filed: Jun. 8, 1987

[51] Int. Cl.$^4$ ............... B29C 69/00; B29C 11/12; A23G 9/28
[52] U.S. Cl. ................... 425/140; 53/518; 62/344; 141/168; 425/142; 425/145; 425/297; 425/301; 425/306; 425/308
[58] Field of Search .............. 425/135, 140, 142, 145, 425/289, 296, 301, 306, 308, 297; 53/244, 518, 519; 141/108, 94, 311 R, 369, 168, 171; 62/340, 344, 356, 341

[56] References Cited

U.S. PATENT DOCUMENTS

| | | | |
|---|---|---|---|
| 1,544,802 | 7/1925 | Burkeman | 425/145 |
| 2,579,096 | 12/1951 | Schulz | 53/518 |
| 2,626,133 | 1/1953 | Reed | 425/135 |
| 2,984,059 | 5/1961 | Hollingsworth | 62/344 |
| 3,085,520 | 4/1963 | Fiedler | 425/308 |
| 3,677,681 | 7/1972 | Zippel et al. | 425/145 |
| 4,223,043 | 9/1980 | Johnson | 249/127 |
| 4,343,603 | 8/1982 | Pavlow et al. | 425/142 |
| 4,647,468 | 3/1987 | Pinto | 425/296 |

FOREIGN PATENT DOCUMENTS 604530  9/1960  Canada .............................. 53/518

Primary Examiner—Willard Hoag
Attorney, Agent, or Firm—B. B. Olive

[57] ABSTRACT

An apparatus and method for dispensing frozen food products is based upon the frozen food product, e.g. ice cream, being packaged in a coiled tubular casing and providing means for cutting off incremental lengths after removing the casing and then forming a scoop of the food product with a scoop which transfers the charge to a dumping position where the charge is released into a suitable food container.

8 Claims, 6 Drawing Sheets

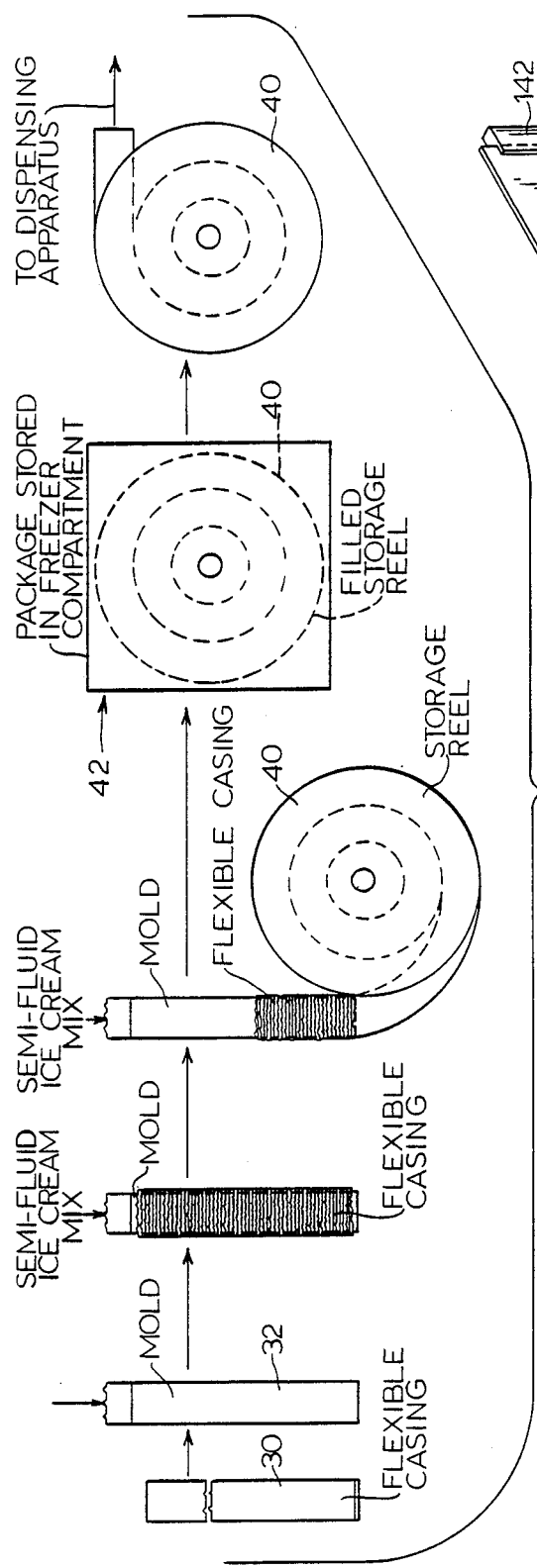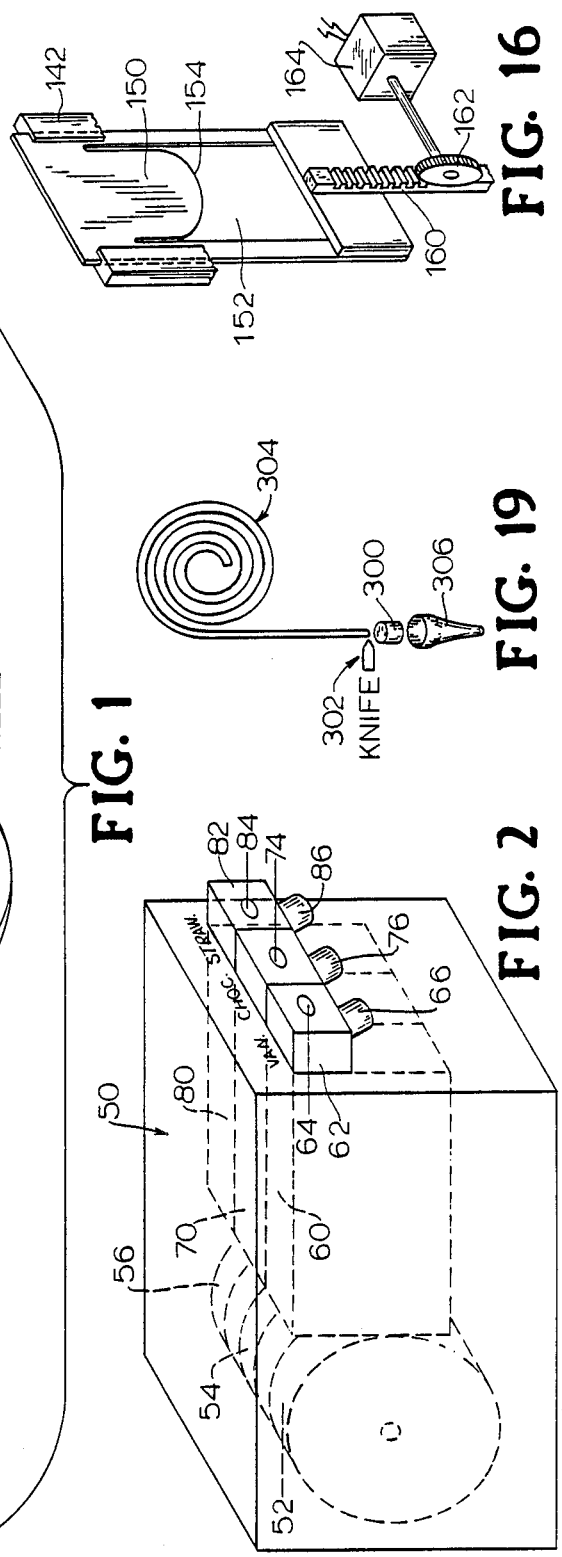

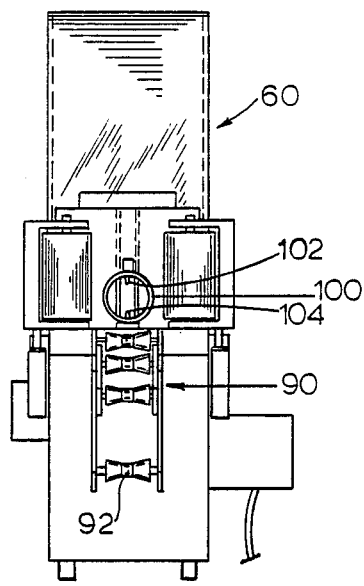 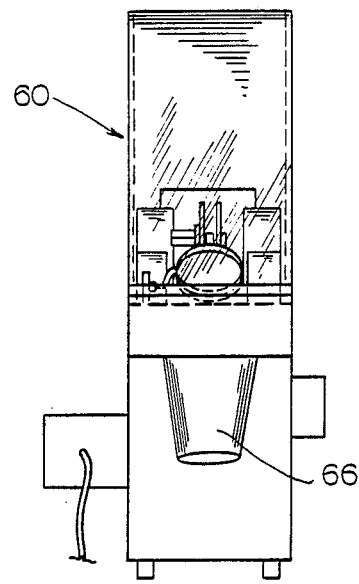
FIG. 5    FIG. 6
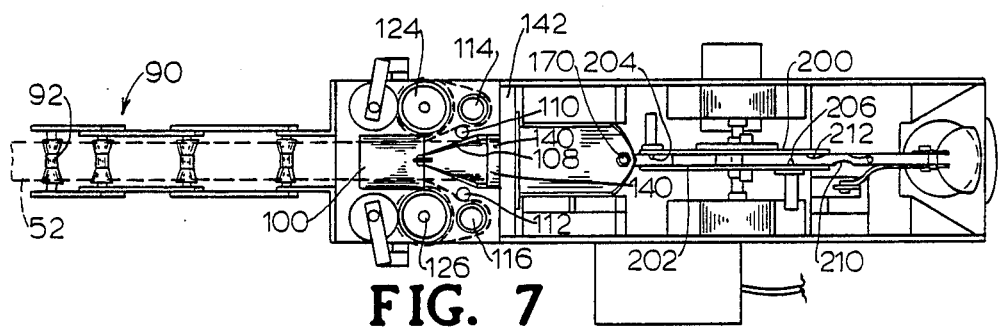
FIG. 7
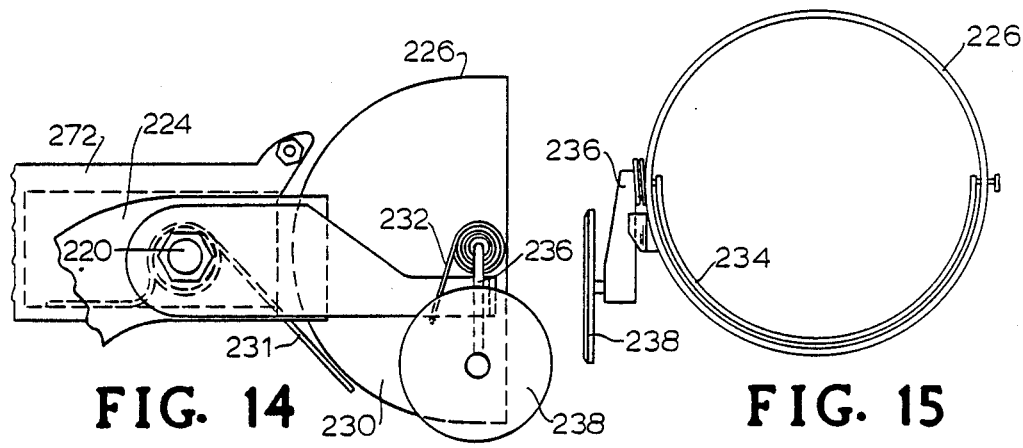
FIG. 14    FIG. 15

APPARATUS FOR PACKAGING AND DISPENSING ICE CREAM AND THE LIKE

TECHNICAL FIELD

The invention relates broadly to dispensing and more specifically to dispensing scoops or like increments of frozen foods, particularly ice cream, from a supply formed in a removable tubular casing.

BACKGROUND ART

Ice cream is typically scooped from a container. However, it has also been known to dispense ice cream by forcing the ice cream from a supply into a scoop or other type mold and discharging individual scoops or molds of ice cream. Such apparatus is illustrated in U.S. Pat. Nos. 2,716,385; 2,728,306; 2,778,321; 2,899,988; 3,590,750; and 4,420,948. Individual scoops of ice cream have also been molded and discharged directly from the molds as in U.S. Pat. No. 4,244,470 or into a container as in U.S. Pat. No. 4,645,093. Frozen confections have also been packaged in a flexible, segmented plastic tube formed so as to allow individual portions to be easily separated as in U.S. Pat. No. 4,223,043. Sausage and other meat products have also been packaged in a relatively long tubular casing. Cookie dough, cheese, and other food products have also been packaged in relatively short tubular casings and are sometimes stored in a frozen state. In some applications the tubular casing is edible and in other applications is inedible and must be removed prior to consumption of the encased product. The advantages of storing sausage in a relatively long, flexible tubular casing have long been recognized. However, it has not been known so far as applicant is aware to package ice cream or the like in a tubular casing, freeze the casing and its contents, coil the frozen tubular encased ice cream and store the coils of ice cream as a stored bulk supply in a dispensing apparatus. More specifically, it has not been known to provide apparatus for forming scoops of ice cream from such a frozen tubular supply and transferring individual scoops to a cup, ice cream cone or the like in coordination with removing the casing from the ice cream.

The present invention therefore has as its principal object that of providing an apparatus and method based on dispensing individual scoops of ice cream or the like from a frozen bulk supply stored in an elongated relatively long tubular casing. Other objects will appear as the description proceeds.

DISCLOSURE OF INVENTION

The method and apparatus of the invention are directed to first preparing a semi-fluid ice cream mix or other food mix to be dispensed in frozen form. The mix is loaded into a flexible tubular casing, is then coiled and stored in a freezer compartment. Several different flavors of the ice cream, e.g., vanilla, chocolate and strawberry, are encased and stored in a similar coiled, frozen form. Apparatus is provided enabling the particular flavor to be selected, the corresponding coiled casing containing the selected flavor to be unwound, the leading end of the casing removed and the leading end transferred to a scoop and the charged scoop moved to a location where the contents are discharged into a cone, cup or the like.

DESCRIPTION OF THE DRAWINGS

FIG. 1 is a schematic diagram of the steps involved in loading the ice cream or other frozen food products preparatory to dispensing.

FIG. 2 is a somewhat schematic perspective view of an ice cream dispensing apparatus according to the invention.

FIG. 5 is an end view of the intake end of the FIG. 3 apparatus.

FIG. 6 is an end view of the discharge end of the FIG. 3 apparatus.

FIG. 7 is a plan view of the FIG. 3 apparatus with the cover removed.

FIG. 14 is an enlarged partial side view of the scoop mechanism only.

FIG. 15 is an end view of the FIG. 14 scoop mechanism.

FIG. 16 is a schematic diagram of the invention blade or knife assembly used for severing individual increments of ice cream.

FIG. 19 is a schematic drawing showing a casing, a knife and a cone illustrating an embodiment in which the severed ice-cream is dropped directly into a core.

BEST MODE FOR CARRYING OUT THE INVENTION

Figure 3:
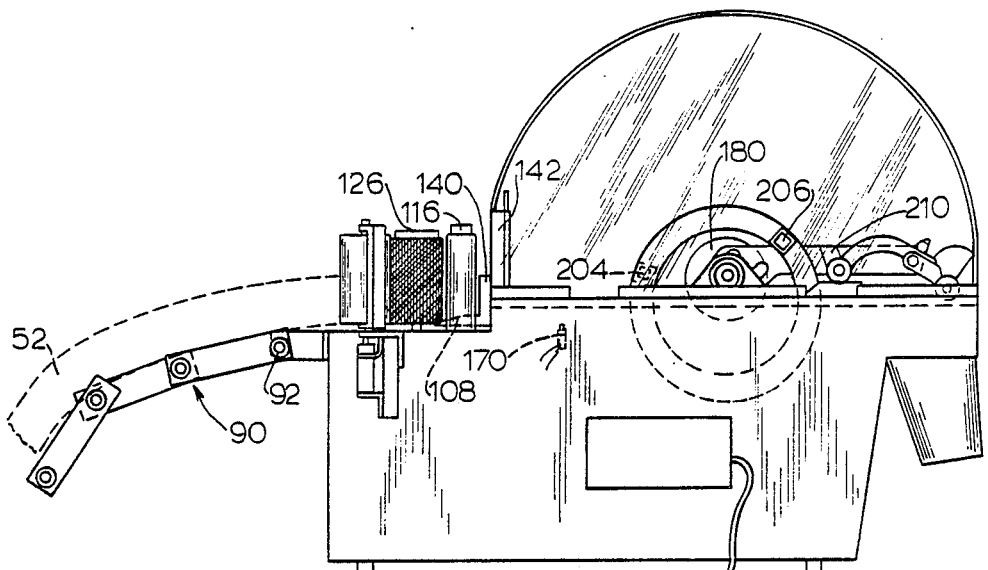
FIG. 3 is a side view of the invention apparatus associated with dispensing a single flavor and with the scoop being moved horizontally and tilted immediately prior to dumping.

Making reference initially to FIG. 1, there is schematically illustrated the steps involved in preparing ice cream for the dispensing apparatus of the invention. Initially there is assembled a relatively thin wall flexible casing 30 and a suitable mold 32. The casing 30 is fitted over the mold 32 as schematically illustrated in FIG. 1 for receiving a semi-fluid ice cream mix. The filled casing 30 is then withdrawn from the mold 32 and stored in coiled form on a storage reel 40. In a typical application, the filled casing would be 60 to 100 feet in length and approximately two to three inches in diameter. A suitable government approved plastic tube for this purpose is made by Leepack, Inc., of Chicago, Ill. 60606 and is sold as the Unilox clear three inch poly tube. Such plastic is capable of maintaining its integrity to minus forty degrees Fahrenheit and can also be easily removed without adhering to the ice cream during removal. Various kinds of well-known apparatus for stuffing food materials into flexible casings may be used for loading the semi-fluid ice cream mix into the flexible casing 30 and the stuffing apparatus per se forms no part of the invention. The reel of coiled tubular encased ice cream is stored in a freezer compartment 42 from which it is transferred to the dispensing apparatus as further illustrated in FIG. 1.

By way of general illustration in FIG. 2, it is assumed that three flavors, e.g., vanilla, chocolate, and strawberry, are to be dispensed according to the method and apparatus of the invention. There is thus illustrated in FIG. 2 a refrigerated dispensing apparatus 50 for storing a coil 52 of frozen tubular encased vanilla ice cream, a coil 54 of frozen tubular encased chocolate ice cream and a coil 56 of frozen tubular encased strawberry ice cream and maintaining such ice cream in a frozen state. Coil 52 feeds a dispensing apparatus 60 which upon actuation of control switch 64 dispenses a scoop of vanilla ice cream through a discharge opening 66. In like manner the frozen coil 54 of chocolate ice cream feeds a dispensing apparatus 70 and dispenses chocolate ice cream through a discharge opening 76 upon actuation of control switch 74. The frozen coil 56 of strawberry ice cream in a similar manner feeds a dispensing apparatus 80 having a control switch 84 and a discharge opening 86. What is to be understood at this point in the description is that the dispensing apparatus 50 of the invention generally uses a plurality of such coils of tubular encased frozen ice cream as as individual coiled bulk supplies and dispenses individual scoops of selected flavors from such supply coils in the manner next explained.

Since each dispensing apparatus for each of the flavors provided is generally of uniform construction reference is next made to FIGS. 3–16 illustrating the details of the typical dispensing apparatus according to the invention with dispensing apparatus 60 for the vanilla flavor being arbitrarily chosen for detailed description by way of example.

The leading end of the frozen coiled tube 52 being used by way of example is fed over an adjustable track 90 fitted with rollers 92 as somewhat schematically illustrated in the drawings. The leading end of the frozen tube 52 is fed through a hollow tubular guide 100 (see FIGS. 5 and 7) fitted at its exit end with a pair of oppositely disposed replaceable cutting knives 102, 104 which serve to split the casing 30 into two half sections. Guide 100 is supported by arms 108 extending from tubular guide 140 through which the ice cream passes. Each of the half casing sections is fed over respective smooth surfaced guide pins 110, 112, then over respective smooth surfaced cylindrical guides 114, 116 and then to respective knurled motor driven take-up rolls 124, 126.

A rotary switch 130 (designated RS in FIG. 17) comprises a pin wheel 132 mounted on a shaft 134 connected to rotary switch 136. The peripheral size of pin wheel 132 is selected to correspond to the desired uniform incremental length of tube 52 to be withdrawn for forming each scoop of ice cream as later explained. Such length might, for example, be in the range of two to three inches. Pin wheel 132 contacts and rotates with the casing. Rotary switch 130 as later explained, stops the operation of the feed motor M-1 (FIG. 17) after a single rotation and resets itself for the next cycle. Rotary switch 130 is thus adapted to measure off some uniform predetermined length of ice cream each time the corresponding control switch 66 is actuated. Thus, as the size of the coil 52 decreases a constant length or increment of ice cream will be pulled through the guide 100 for each scoop operation. Switch 130 (Switch RS in FIG. 17) overrides a timer, designated T in FIG. 17, which in turn controls drive motor 138, designated M-1 in FIG. 17, driving knurled take-up rollers 124, 126.

The measured increment of ice cream now without its casing passes through hollow cylindrical guide 140 and through a frame 142 which slidably mounts a guillotine like blade 150 (FIG. 16) formed with an opening 152 below a curved cutting edge 154. Blade 150 is reciprocated vertically by means of a gear rack 160 driven up and down by an engaging gear 162 driven by a reversible drive motor 164, designated M-2 in FIG. 17. Further details of a representative control circuit are given later in the description. What is to be understood here is that a measured increment of ice cream is withdrawn from tube 52 simultaneously with removing the casing. After the drive rollers 124, 126 which pull off the slit casing halves have been stopped, the measured increment extends beneath and forward of the guillotine blade 150 preparatory to being cut off from the trailing portion of the coil 52. At this stage, the scoop 226 and scoop arm 272, later referred to in more detail, are in the dumping or discharge position terminating the previous cycle of operation.

Figure 8:
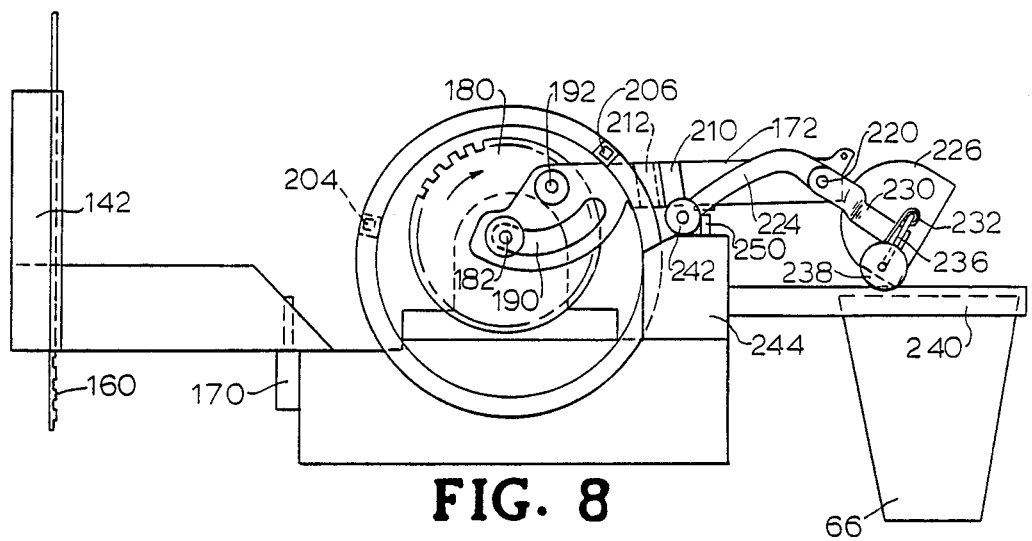
FIG. 8 is a side view of the scoop apparatus only, in a position immediately prior to discharge.
Figure 9:
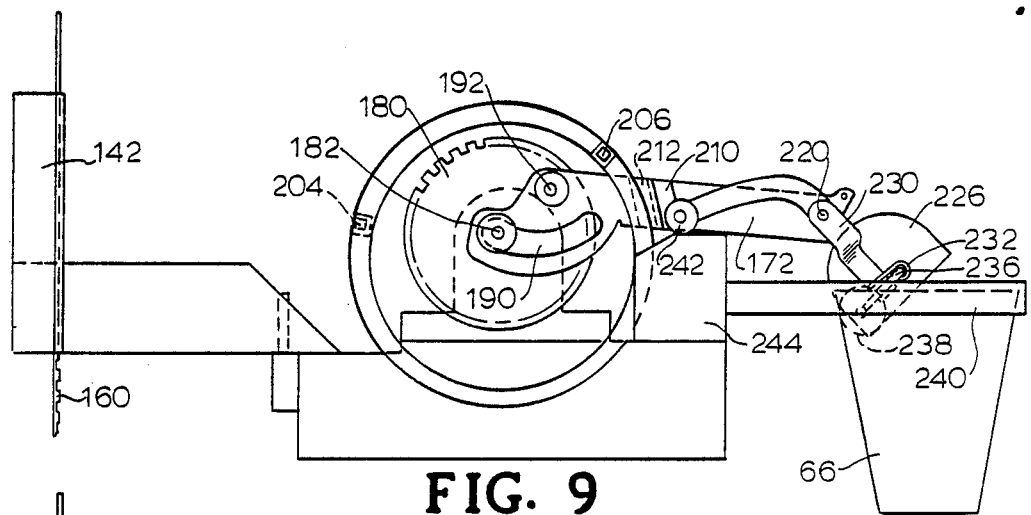
FIG. 9 is a side view of the scoop apparatus only, in a discharge or dumping position.
Figure 10:
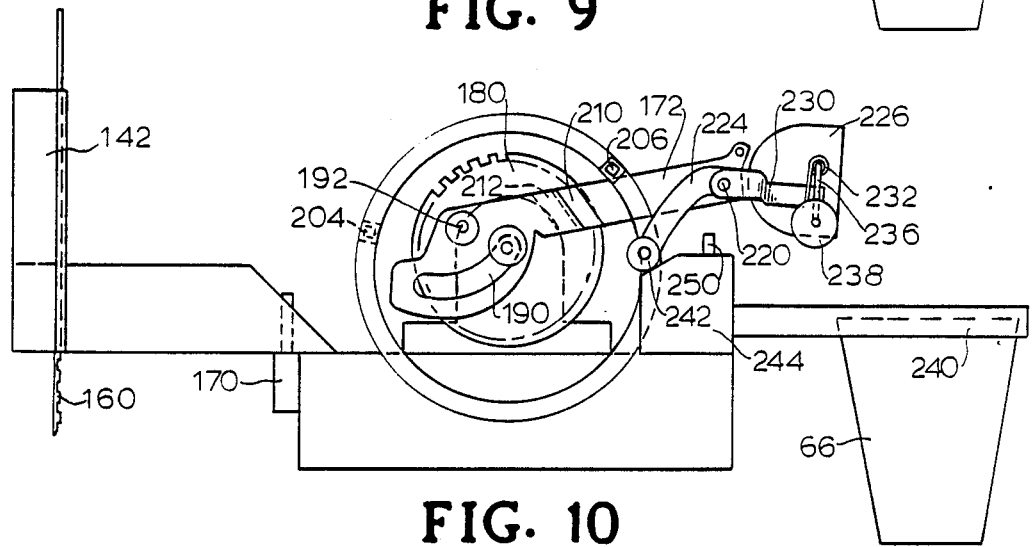
FIG. 10 is a side view of the scoop apparatus only, in a position after discharge and with the scoop moving substantially horizontal towards its loading position.
Figure 11:
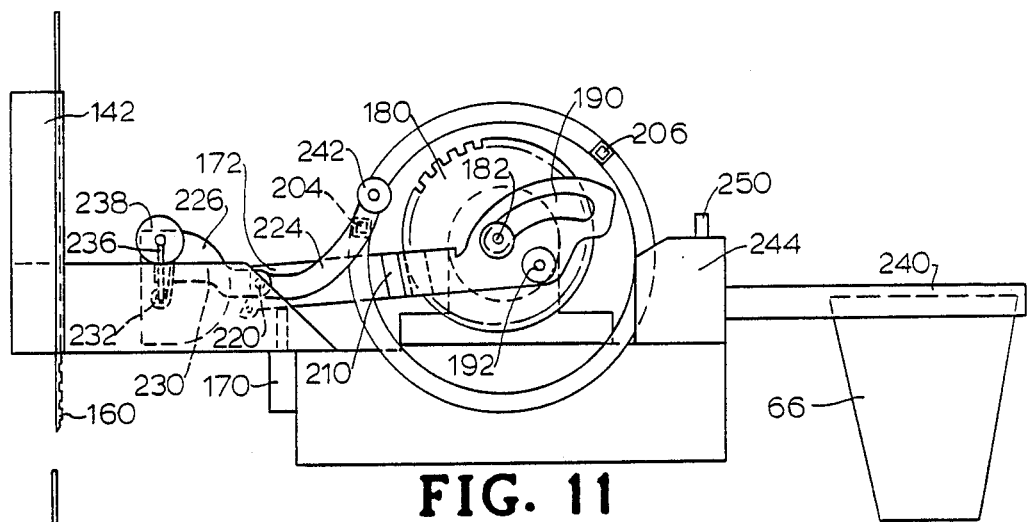
FIG. 11 is a side view of the scoop apparatus in a first stage of loading.
Figure 12:
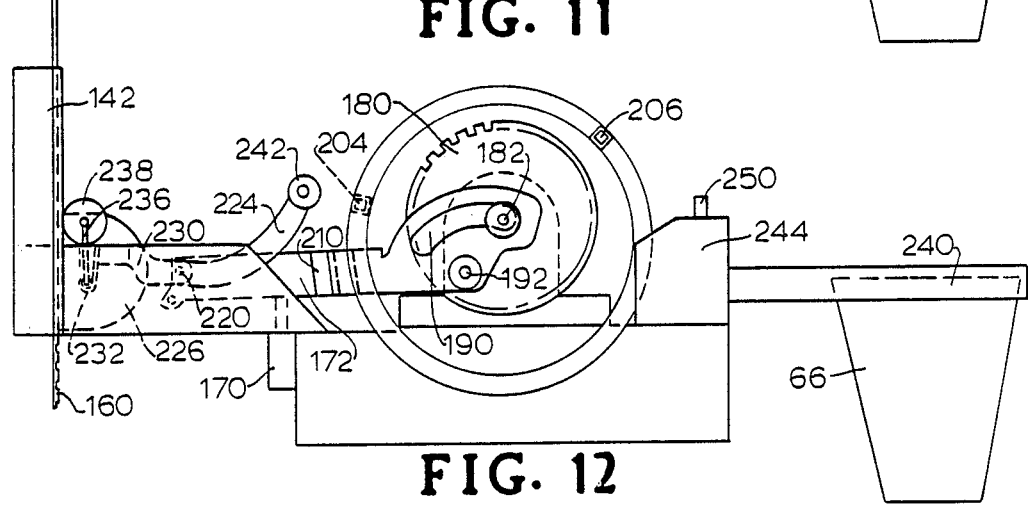
FIG. 12 is a side view of the scoop apparatus in a second stage of loading during which the scoop compresses the previously cut-off length of frozen ice cream against the now-lowered blade.
Figure 17:
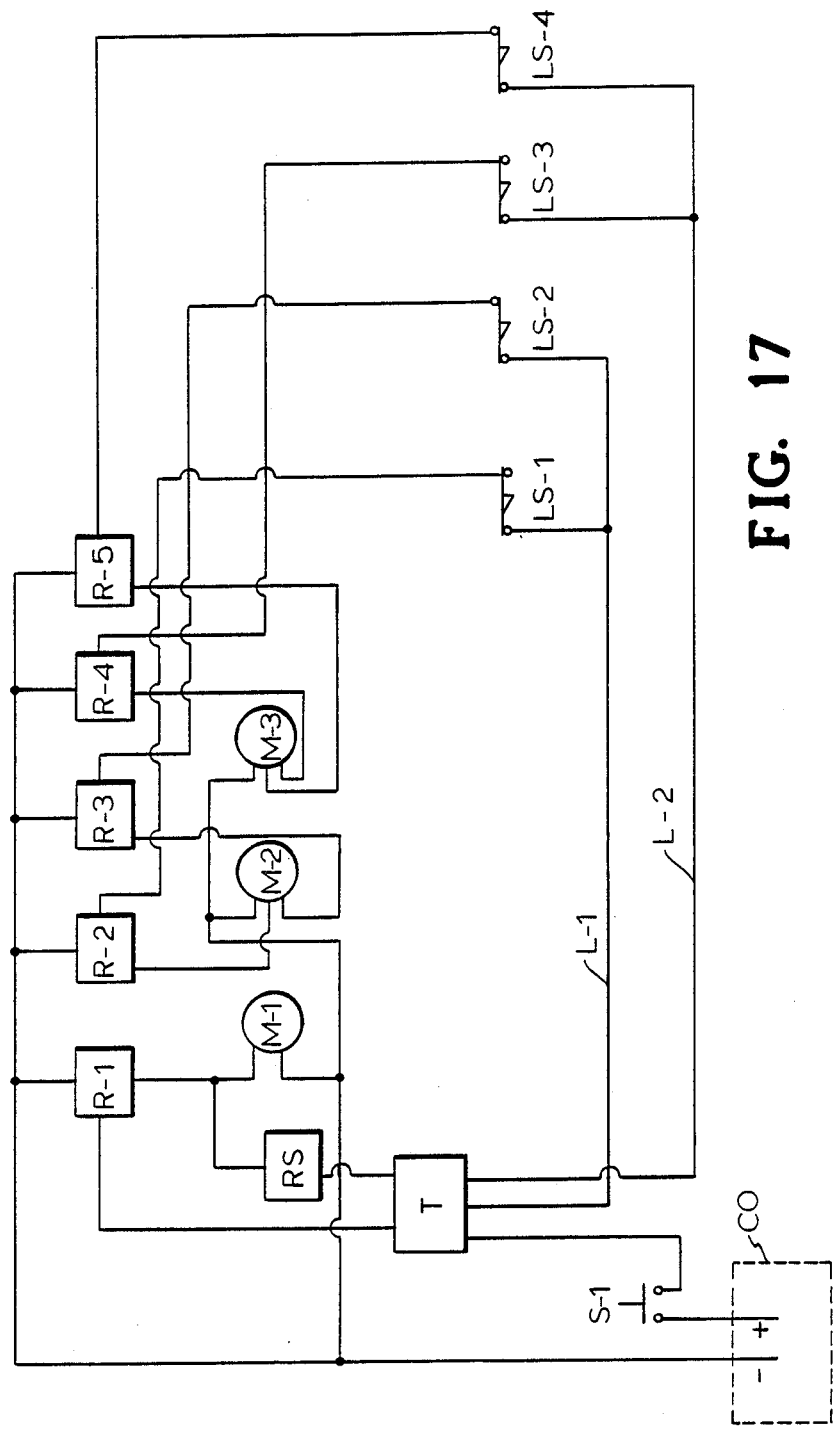
FIG. 17 is a schematic wiring diagram.

Blade motor 164, designated blade motor M-2 in the FIG. 17 circuit diagram, which controls activation of the guillotine blade 150 is controlled by means of a switch 170, designated switch LS-1 in the FIG. 17 circuit diagram, actuated by scoop arm 172. That is when scoop arm 172 moves to the position illustrated in FIG. 11 switch 170 is actuated in a manner to cause the guillotine blade drive motor 164, designated blade motor M-2 in FIG. 17, as previously mentioned, to move the guillotine blade edge 154 through the measured increment of ice cream so as to separate such increment from the remaining length of the coiled ice cream tube 52. Movement of scoop arm 172 between a loading position as, for example, in FIGS. 11 and 12 to a dump or discharge position as, for example in FIGS. 8 and 9 is controlled in its bidirectional movement by the bidirectional rotation of gear 180 driven by scoop motor 254, designated motor M-3 in FIG. 17, through gear 256. Gear 180 mounts on and rotates around central shaft 182 which passes through a curved slot 190 formed in scoop arm 172. Scoop arm 172 in turn mounts on shaft 192. This unique arrangement of scoop arm 172 thus allows scoop arm 172 to move between a full loading position as in FIG. 13 to a full dumping position as in FIG. 9. As scoop arm 172 moves into and retracts from the loading position, arm 172 moves substantially horizontally. Scoop arm 172 also moves substantially horizontally when moving into and retracting from the dumping or discharge positions. Between loading and dumping, scoop arm 172 is caused to rotate by reason of the central shaft 182 engaging one or the other ends of slot 190 as shaft 192 rotates about the axis of shaft 182. A somewhat more detailed description of this operation follows next.

Scoop arm 172 and gear 180 mount between a stationary pair of thin but rigid circular plate members 200, 202. Plate member 200 mounts a fixed tapered pin 204 and plate member 202 mounts a fixed tapered pin 206. Pins 204 and 206 limit rotary travel of scoop arm 172 and cause scoop arm 172 to travel horizontally in certain phases of operation, as previously referred to.

Scoop arm 172 is provided with one slot 210 which at an appropriate stage of the rotated travel of scoop arm 172 is adapted to slidably engage pin 206 whereas another slot 212 formed in the opposite side of scoop arm 172 is formed to slidably engage pin 204 during a different stage of the rotative travel of scoop arm 172. The engaging tip portions of pins 204, 206 are shaped for this functional purpose and thus limit when rotation of scoop arm 172 can take place.

Before proceeding further with the operation of the scoop mechanism, it will be noted that scoop arm 172 mounts on shaft 220 a curved arm 224 to which is rigidly secured the scoop 226. Thus pivoting of arm 224 on scoop arm 172 causes corresponding pivoting of scoop 226. An auxiliary arm 230 tensioned by spring 231 forms a rigid extension of arm 224 and pivots with arm 224 about shaft 220. As best illustrated in FIGS. 14 and 15, scoop 226 is emptied by means of a rotating semicircular shaped wire 234 operated by means of arm 236 and cam roller 238 which strikes a suitable strike surface 240 as in FIG. 9 to facilitate dumping simultaneous with roller 242 mounted on arm 224 striking another cam surface 244 as in FIG. 9.

Figure 13:
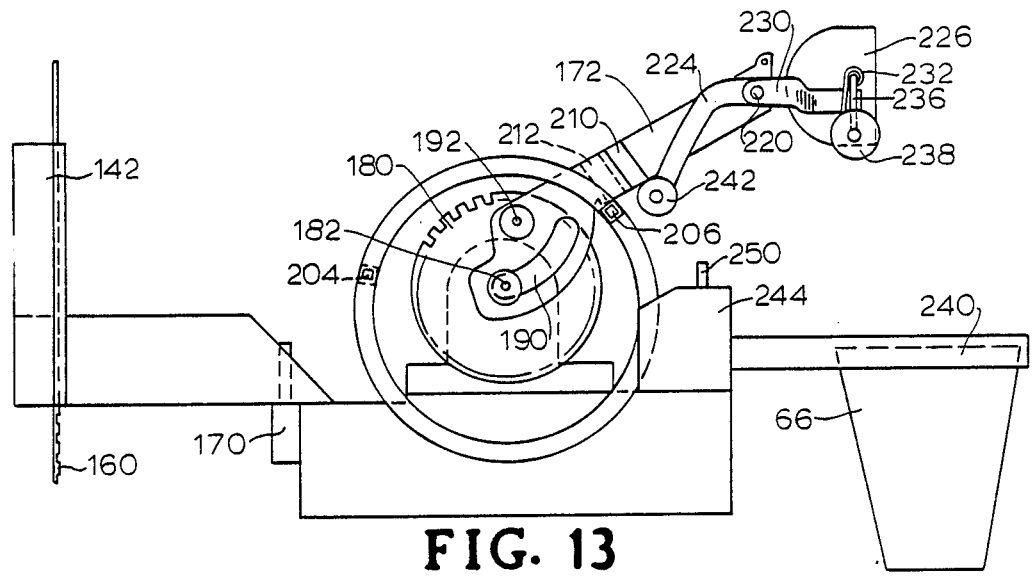
FIG. 13 is a side view of the loaded scoop apparatus moving towards the discharge position of FIG. 8.

Having now described the basic construction, a typical sequence of operations will next be explained in reference to the drawings. With scoop arm 172 positioned as in FIG. 11 continued rotation of gear 180 in a counterclockwise direction as viewed in FIG. 12 will cause scoop arm 172 to move scoop 226 to the left. At this stage the guillotine blade or knife 150 will be down so as to provide a firm surface enabling scoop 226 to be charged with the increment of ice cream previously cut off by the guillotine blade 150. After this charging operation in which scoop 226 moves in from the position of FIG. 11 to the charging position of FIG. 12, scoop arm 172 then as gear 180 rotates in a clockwise direction as viewed in FIG. 12 first retracts, engages pin 204 in slot 212, slides pin 204 through slot 212 and then rotates with the charge of ice cream in scoop 222, as seen in FIG. 13. As scoop arm 172 continues to descend roller 242 on arm 224 engages block 244 causing scoop 226 to rotate about its supporting shaft 220 as seen in FIG. 8. As scoop arm 172 continues to move down and reaches its full dumping position, it strikes and actuates switch 250, designated switch LS-4 in FIG. 17, which causes scoop motor 254 driving gear 180 through interconnecting gear 256 to stop. This final movement is coordinated with roller 238 striking surface 240 and releasing the scoop of ice cream in the discharge opening 66. At this stage the operation is considered complete. When the next purchaser of ice cream pushes the control button 64 the sequence just described is repeated. That is, the coiled frozen ice cream supply tube 52 is advanced, a uniform increment is cut off by blade 154, blade 154 is lowered, scoop 226 is charged by advancing against blade 154 and is then returned to the discharge position.

While the preceding description is based upon the contemplated use of an inedible casing requiring removal before the encased food is consumed, the invention also contemplates use of an edible casing having sufficient flexibility to permit coiling and unwinding of the frozen food product when encased in the edible casing. Plastic formulations such as used for encased pills and the like that dissolve in the body without harm as well as appropriate flavored coatings are recognized as being suitable for such purpose. Also contemplated, as schematically illustrated in FIG. 19, is severing of a uniform length 300 by means of a blade 302 from a frozen coiled casing supply 304 and dropping the ice cream directly into a cone 306 without use of a scoop.

Figure 18:
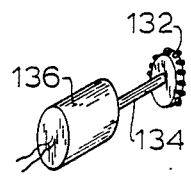
FIG. 18 is a schematic diagram of an alternative embodiment not employing a scoop.
Figure 4:
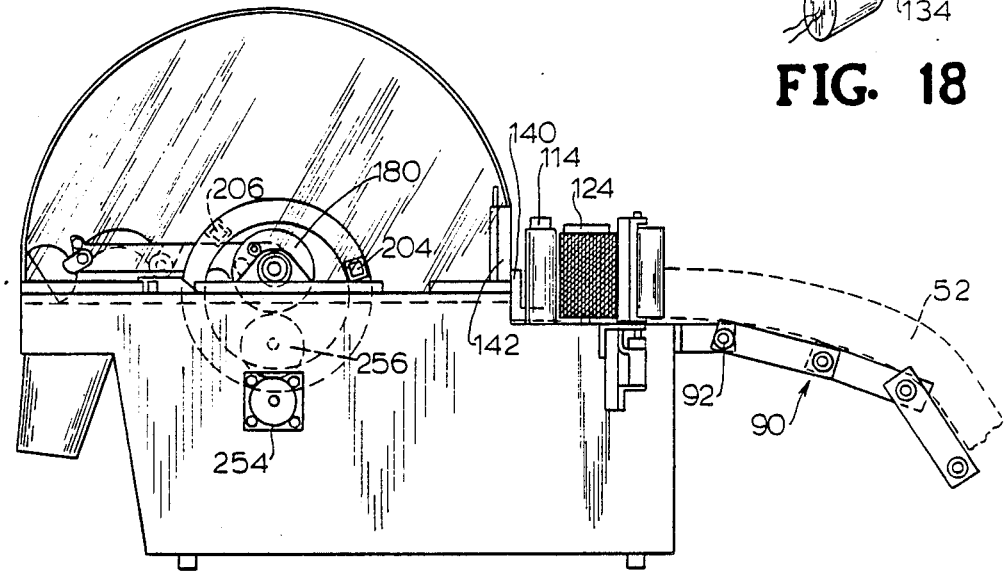
FIG. 4 is a side view of the FIG. 3 apparatus taken from the side opposite to that of FIG. 3.

The apparatus of the invention lends itself to various types of control systems therefore FIG. 17 to which reference is next made schematically and generally illustrates one such system. Push button start switch S-1, corresponding to switch 64 in FIG. 2, actuates relay R-1 through timer T which operates on a fixed time cycle and thus energizes feed motor M-1 and rotary switch RS. Rotary switch RS (designated 136 in FIG. 18) overrides timer T and thus feed motor M-1 runs for a fixed time determined either by timer T or rotary switch 130. Relay switch R-1 powers feed motor M-1 which rotates the take-up rollers 124, 126. An incremental length of the frozen ice cream tube is measured off and passed through the blade opening 152 (FIG. 16) as knives 102, 104 slit the casing which is rolled up on the take up rollers 124, 126. Rotary switch 130, designated switch RS in FIG. 17, after one rotation corresponding to the desired incremental length resets itself to off position. After the preset time, timer T switches and powers one side of the respective upper and lower blade limit switches LS-1 (normally closed) and LS-2 (normally open) through line L-1. Relay R-1 and feed motor M-1 are deenergized. Relay R-2 is energized which energizes the blade motor M-2. Blade motor M-2 causes the blade 154 to descend and sever the now measured off incremental length of ice cream. Blade motor M-2 is deenergized when bottom blade switch 155 (FIG. 16), designated switch LS-2 in FIG. 17, is actuated corresponding to blade 154 reaching its lowest position. Relay R-3 is now energized which reverses blade motor M-1. Blade 154 rises and limit switch LS-2 is returned to its normally open position. Timer T next deenergizes line L-1 and energizes line L-2 which powers one side of the respective scoop limit switches LS-3 (normally closed) and LS-4 (normally open). Relay R-4 is now energized which energizes the scoop motor M-3 which causes the scoop arm to rotate from the full dump position of FIG. 9 through the subsequent positions shown in FIGS. 10-12 to the full charge position of FIG. 12. Limit switch LS-3 is opened and limit switch LS-4 is closed which energizes Relay R-5. Scoop motor M-3 is caused to reverse and rotate toward the release positon and the scoop arm to rotate to the dump position of FIG. 9. At the release position the scoop limit switch LS-3 returns to its normally close position, switch LS-4 to its normally open position and timer T to its start position.

While not forming part of the invention, a conventional coin operator designated CO and shown in dashed lines in FIG. 17 may be employed to initiate operation.

What I claim is:

1. An apparatus for dispensing a coiled tubular encased frozen food product comprising, in combination:
   (a) guide means for receiving the leading end of the coiled casing;
   (b) slitting means associated with said guide means for slitting said casing lengthwise along a pair of diametrically opposite lines of cut while being drawn through said guide means;
   (c) driven take-up roller means formed for receiving leading ends of the slit casing after passing said slitting means and taking up the slit casing as a means for advancing the trailing said casing;
   (d) electrically controlled measuring means operative to measure off a predetermined length of the leading end of said encased frozen food product and to thereafter stop said roller means;

(e) powered cutting means operative to sever said predetermined length of frozen food product;

(f) means for transferring said severed length to a food container; and (g) a refrigerated housing enclosing said coiled tubular encased product, said guide means, said slitting means, roller means, measuring means, cutting means and transferring means.

2. An apparatus as claimed in claim 1 wherein said means for transferring said cut-off length to a food container includes:

(a) a scoop;

(b) means mounting said scoop for movement enabling said scoop to move to a first position to be charged with said cut-off length and followed by movement to a second position at which said scoop is tilted for dumping the contents thereof; and (c) means for releasing the food product charge from said scoop.

3. An apparatus as claimed in claim 2 wherein said means mounting said scoop moves said scoop against said cutting means at said first position to charge said scoop.

4. An apparatus as claimed in claim 3 wherein said means mounting said scoop moves said scoop substantially horizontally during charging of said scoop.

5. An apparatus as claimed in claim 3 wherein said means mounting said scoop operates bidirectionally and during both charging and dumping of said scoop moves said scoop substantially horizontally through at least a portion of the respective charging and dumping operations.

6. An apparatus for dispensing a coiled tubular encased frozen food product comprising, in combination:

(a) powered pulling means for unwinding and advancing the leading end of the encased coiled product;

(b) measuring means operative to measure off a predetermined length of the leading end of the encased coiled product;

(c) powered cutting means operative dependent upon said predetermined length having been measured to sever said predetermined length from said leading end;

(d) transfer means for transferring said severed length to a food container;

(e) a refrigerated housing for housing the coiled tubular encased frozen food product, said powered pulling means said measuring means, said powered cutting means, and said transfer means as a unitary dispensing assembly; and (f) control means operative to cause said pulling, measuring, cutting and transferring means to advance, sever, and transfer said predetermined length to said food container in a continuous uniform sequence.

7. An apparatus as claimed in claim 6 wherein said frozen food product is encased in an inedible casing including:

(a) means associated with said pulling means operative to slit and remove the casing during advancing of said leading end; and (b) a scoop associated with said transfer means on movable support means operative to receive said severed length as a charge in said scoop and thereafter dump said charge in said container.

8. An apparatus as claimed in claim 7 wherein said cutting means includes a blade and said scoop presses said severed length against said blade to charge said scoop.

* * * * *

UNITED STATES PATENT AND TRADEMARK OFFICE
CERTIFICATE OF CORRECTION

PATENT NO. : 4,762,483

DATED : August 9, 1988

INVENTOR(S) : John M. Zevlakis

It is certified that error appears in the above-identified patent and that said Letters Patent is hereby corrected as shown below:

Column 2, line 48, correct "core" to read --cone--.

Signed and Sealed this

Twenty-ninth Day of August, 1989

Attest:

DONALD J. QUIGG

*Attesting Officer*     *Commissioner of Patents and Trademarks*